US010748208B2

(12) United States Patent
Yamanaka et al.

(10) Patent No.: US 10,748,208 B2
(45) Date of Patent: Aug. 18, 2020

(54) SCHEME FOR PROCESSING RENTAL CONTENT IN AN INFORMATION PROCESSING APPARATUS

(75) Inventors: Yasuhiro Yamanaka, Urayasu (JP); Masaki Higuchi, Minato-ku (JP); Hirofumi Shimada, Yokohama (JP); Syunichi Souma, Funabashi (JP); Kiyobumi Matsunaga, Ota-ku (JP); Yuichiro To, Nakano-ku (JP)

(73) Assignee: Sony Interactive Entertainment Inc., Tokyo (JP)

(*) Notice: Subject to any disclaimer, the term of this patent is extended or adjusted under 35 U.S.C. 154(b) by 717 days.

(21) Appl. No.: 12/991,417

(22) PCT Filed: Feb. 27, 2009

(86) PCT No.: PCT/JP2009/000919
§ 371 (c)(1),
(2), (4) Date: Jan. 27, 2011

(87) PCT Pub. No.: WO2009/153903
PCT Pub. Date: Dec. 23, 2009

(65) Prior Publication Data
US 2011/0131115 A1 Jun. 2, 2011

(30) Foreign Application Priority Data

Jun. 17, 2008 (JP) .................................. 2008-158570
Jun. 17, 2008 (JP) .................................. 2008-158571
Jun. 30, 2008 (JP) .................................. 2008-170190

(51) Int. Cl.
*G06Q 30/00* (2012.01)
*G06Q 30/06* (2012.01)
(Continued)

(52) U.S. Cl.
CPC ......... *G06Q 30/0645* (2013.01); *G06Q 30/06* (2013.01); *G06Q 30/0603* (2013.01);
(Continued)

(58) Field of Classification Search
CPC ........... G06Q 30/0601; G06Q 30/0619; G06Q 30/06; G06Q 30/0603; G06Q 30/0643;
(Continued)

(56) References Cited

U.S. PATENT DOCUMENTS 5,925,127 A * 7/1999 Ahmad ................. G06F 21/121
726/31
6,563,999 B1   5/2003 Suzuoki
(Continued)

FOREIGN PATENT DOCUMENTS

JP   H11296437   10/1999
JP   2000242699   9/2000
(Continued)

OTHER PUBLICATIONS

"Applying DRM Techniques to Video on the Internet: Characterizing Problems and Solutions," by Eric Grab, SMPTE Journal, Apr. 2002 (Year: 2002).*
(Continued)

*Primary Examiner* — Anne M Georgalas
(74) *Attorney, Agent, or Firm* — Fitch, Even, Tabin & Flannery LLP

(57) ABSTRACT

A purchase type determining unit 244 determines whether content is rental content, which has a valid time limit for enjoying, from purchasing type information included in the license information. An icon image processing unit 352 disposes an icon image of the content in a menu screen. In case the content is determined to be rental content by the purchase type determining unit 244, a rental mark disposing unit 356 disposes a rental mark indicating that associated (Continued)

content is rental content near the icon image of the content or disposes the rental mark so as to overlap with the icon image of the content.

9 Claims, 12 Drawing Sheets

(51) Int. Cl.
| | |
|---|---|
| H04N 7/173 | (2011.01) |
| H04N 21/4627 | (2011.01) |
| H04N 21/472 | (2011.01) |
| H04N 21/8355 | (2011.01) |
| G06Q 50/18 | (2012.01) |

(52) U.S. Cl.
CPC ....... *G06Q 30/0643* (2013.01); *G06Q 50/184* (2013.01); *H04N 7/17318* (2013.01); *H04N 21/4627* (2013.01); *H04N 21/47202* (2013.01); *H04N 21/8355* (2013.01)

(58) Field of Classification Search
CPC ............. G06Q 30/0645; G06Q 50/184; H04N 21/254; H04N 21/8355; H04N 7/17318; H04N 21/47202; H04N 21/4627
USPC ........................................................ 705/26.1
See application file for complete search history.

(56) References Cited

U.S. PATENT DOCUMENTS

| | | | | |
|---|---|---|---|---|
| 6,865,555 | B2* | 3/2005 | Novak | G06Q 20/3821 |
| | | | | 348/E7.071 |
| 6,901,386 | B1* | 5/2005 | Dedrick | G06Q 10/10 |
| | | | | 380/201 |
| 7,103,663 | B2 | 9/2006 | Inoue | |
| 7,278,165 | B2* | 10/2007 | Molaro | G06F 21/10 |
| | | | | 380/201 |
| 8,161,410 | B2* | 4/2012 | Bray | 715/848 |
| 8,204,362 | B2* | 6/2012 | Aratani et al. | 386/248 |
| 8,564,723 | B2 | 10/2013 | Nakajima | |
| 8,583,558 | B2* | 11/2013 | Fox | G06Q 30/06 |
| | | | | 705/51 |
| 2002/0007485 | A1 | 1/2002 | Rodriguez et al. | |
| 2002/0026445 | A1* | 2/2002 | Chica | G06F 21/10 |
| 2003/0005135 | A1 | 1/2003 | Inoue | |
| 2004/0064832 | A1 | 4/2004 | Tsukidate et al. | |
| 2004/0133923 | A1* | 7/2004 | Watson et al. | 725/134 |
| 2004/0139024 | A1* | 7/2004 | So | G06Q 20/401 |
| | | | | 705/51 |
| 2005/0289032 | A1* | 12/2005 | Hoblit | 705/35 |
| 2006/0015540 | A1 | 1/2006 | Takeda et al. | |
| 2006/0143134 | A1* | 6/2006 | So | G06F 21/10 |
| | | | | 705/59 |
| 2006/0232695 | A1 | 10/2006 | Yuasa | |
| 2007/0066490 | A1 | 3/2007 | Gemelos | |
| 2007/0136748 | A1* | 6/2007 | Rodriguez et al. | 725/37 |
| 2007/0219917 | A1* | 9/2007 | Liu | G06F 21/10 |
| | | | | 705/59 |
| 2007/0255632 | A1* | 11/2007 | Hatano | G06Q 10/087 |
| | | | | 705/28 |
| 2007/0271578 | A1* | 11/2007 | Thenthiruperai | H04N 7/17318 |
| | | | | 725/23 |
| 2007/0277216 | A1 | 11/2007 | Nakajima | |
| 2007/0283420 | A1* | 12/2007 | Rantalahti | G06F 21/10 |
| | | | | 726/4 |
| 2008/0031591 | A1 | 2/2008 | Okamoto | |
| 2008/0104539 | A1 | 5/2008 | Ikeda | |
| 2008/0109911 | A1* | 5/2008 | Tedesco | G06F 21/10 |
| | | | | 726/30 |
| 2008/0126934 | A1* | 5/2008 | Bray | G06F 3/04815 |
| | | | | 715/713 |
| 2008/0141172 | A1 | 6/2008 | Yamamoto | |
| 2008/0147506 | A1* | 6/2008 | Ling | 705/14 |
| 2008/0163307 | A1* | 7/2008 | Coburn et al. | 725/61 |
| 2008/0181581 | A1* | 7/2008 | Aratani | G11B 20/00086 |
| | | | | 386/326 |
| 2008/0244754 | A1* | 10/2008 | Curren | G06F 21/10 |
| | | | | 726/27 |
| 2008/0314974 | A1* | 12/2008 | Hulst et al. | 235/380 |
| 2009/0178093 | A1* | 7/2009 | Mitsuji et al. | 725/104 |
| 2009/0320142 | A1 | 12/2009 | Takahashi | |

FOREIGN PATENT DOCUMENTS

| | | |
|---|---|---|
| JP | 2000307990 | 11/2000 |
| JP | 2000307994 | 11/2000 |
| JP | 2000-341670 A | 12/2000 |
| JP | 2001056784 | 2/2001 |
| JP | 2002-042013 A | 2/2002 |
| JP | 2002108747 | 4/2002 |
| JP | 2002251819 | 9/2002 |
| JP | 2003131751 | 5/2003 |
| JP | 2003168051 | 6/2003 |
| JP | 2003228524 | 8/2003 |
| JP | 2003235032 | 8/2003 |
| JP | 2003316823 | 11/2003 |
| JP | 2004-005309 A | 1/2004 |
| JP | 2004-040741 A | 2/2004 |
| JP | 2004-048635 A | 2/2004 |
| JP | 2004-326250 A | 11/2004 |
| JP | 2004320510 | 11/2004 |
| JP | 2005-503079 A | 1/2005 |
| JP | 2005122654 | 5/2005 |
| JP | 2005354245 | 12/2005 |
| JP | 2006-031219 A | 2/2006 |
| JP | 2006-079349 A | 3/2006 |
| JP | 2006092307 | 4/2006 |
| JP | 2006-301791 A | 11/2006 |
| JP | 2006-113848 A | 4/2007 |
| JP | 2007115014 | 5/2007 |
| JP | 2007140960 | 6/2007 |
| JP | 2007311927 | 11/2007 |
| JP | 2008118205 | 5/2008 |
| JP | 2008134992 | 6/2008 |
| WO | 00/78031 A2 | 12/2000 |
| WO | 2002084550 | 10/2002 |
| WO | 03/024084 A2 | 3/2003 |
| WO | 2006129614 | 12/2006 |

OTHER PUBLICATIONS

Patent Cooperation Treaty; "International Search Report" issued in corresponding PCT/JP2009/000919; dated May 19, 2009; 8 pages (Includes English translation).

Patent Cooperation Treaty; "International Preliminary Report on Patentability" issued in corresponding PCT/JP2009/000919; dated Jan. 11, 2011; 15 pages (Includes English translation).

Japanese Patent Office; "Notification of Reasons for Refusal" issued in corresponding Japanese Patent Application No. 2008-158570, dated Jan. 8, 2013, 4 pages (includes English translation).

Japanese Patent Office; "Notification of Reasons for Refusal" issued in corresponding Japanese Patent Application No. 2008-158571, dated Jan. 8, 2013, 4 pages (includes English translation).

Japanese Patent Office; "Notification of Reasons for Refusal" issued in corresponding Japanese Patent Application No. 2008-158571, dated Apr. 2, 2013, 4 pages (includes English translation).

Japanese Patent Office; "Notification of Reason(s) for Refusal" issued in corresponding Japanese Patent Application No. 2013-146407, dated Jun. 17, 2014, 5 pages (includes English translation).

Japanese Patent Office; "Appeal Decision" issued in corresponding Japanese Patent Application No. 2017-210462, dated Mar. 31, 2020, 3 pages (includes English translation).

Japanese Patent Office; "Notification of Reason(s) for Refusal" issued in corresponding Japanese Patent Application No. 2014-236727, dated Oct. 6, 2015, 4 pages (includes English translation).

Japanese Patent Office; "Notification of Reason(s) for Refusal" issued in corresponding Japanese Patent Application No. 2016-002003, dated Aug. 1, 2017, 5 pages (includes English translation).

(56) References Cited

OTHER PUBLICATIONS

Japanese Patent Office; "Notification of Reason(s) for Refusal" issued in corresponding Japanese Patent Application No. 2016-002003, dated Jan. 10, 2017, 6 pages (includes English translation).
Japanese Patent Office; "Decision of Refusal" issued in corresponding Japanese Patent Application No. 2017-210462, dated Mar. 12, 2019, 5 pages (includes English translation).
Japanese Patent Office; "Notification of Reason(s) for Refusal" issued in corresponding Japanese Patent Application No. 2017-210462, dated Jul. 10, 2018, 6 pages (includes English translation).
Japanese Patent Office; "Notification of Reason(s) for Refusal" issued in corresponding Japanese Patent Application No. 2017-210462, dated Nov. 20, 2018, 5 pages (includes English translation).

\* cited by examiner

FIG.3A

/VIDEO/XYZ.VDO

FIG.3B

/VIDEO/AA/XYZ.VDO

FIG.4

/LICENSE/USER_ID/ABC.LCN

FIG.10

IN ORDER TO PLAY THE VIDEO CONTENT,
THE LICENSE OF USER PQR WILL BE USED.
WILL YOU PROCEED?

◯ YES    ✕ NO

430

SCHEME FOR PROCESSING RENTAL CONTENT IN AN INFORMATION PROCESSING APPARATUS

FIELD OF THE INVENTION

The present invention relates to technology utilized in information processing apparatuses for processing content, and more specifically, to technology utilized in information processing apparatuses for processing rental content.

BACKGROUND TECHNOLOGY

Along with the development of the Internet, systems that enable the purchase of video content and the download of the contents from the content distribution servers to information processing apparatuses so as users can watch and/or listen to the content, are proposed. As a style of purchasing, one type is to buy video content and the other type is to rent content so as to be able to watch and/or listen to the content for a predetermined period of time. In the case of renting, the time period for watching and/or listening to the content is presumed to be limited. Therefore, the video content should be made unavailable for watching and/or listening to in the information processing apparatuses after the rental period has expired.
[patent document No. 1] U.S. Pat. No. 6,563,999

DISCLOSURE OF THE INVENTION

Problem to be Solved by the Invention

In case that an information processing apparatus retains not only video content but also other variety of program files and/or data files, in some circumstances, it occurs that the rental content is buried in many files, and the user of the content may forget about the existence of the rental content or the user does not know where the content is stored. In such a case, the valid rental period expires while the user does not enjoy the rental content. Therefore, in order to avoid such circumstances, it is preferable that information processing apparatuses provide a user interface where user can easily recognize rental content. Further, if the information processing apparatuses are able to effectively provide a user with information on the rental time period, the level of convenience for using the rental services improves.

In case an information processing apparatus is used while shared by a plurality of users, sometimes different users download the same content. In such a case, the manner of how to allow respective users who share the apparatus to use the rental content is extremely important when providing rental services.

Accordingly, a purpose of the present invention is to provide technology for improving the level of convenience in the handling of rental content.

Means to Solve the Problem

To address the purpose, an information processing apparatus for processing content is provided according to an exemplary embodiment of the present invention. The information processing apparatus comprises: a storage device operative to store content and license information of the content; a purchase type determining unit operative to determine whether or not the content is rental content, which has a valid time limit for accessing, from a purchase type information included in the license information; and a display processing unit operative to generate a display screen for selecting content. The display processing unit is provided with: an icon image processing unit operative to dispose an icon image of the content on the display screen; and a rental mark disposing unit operative to, in case where the content is determined to be rental content by the purchase type determining unit, dispose a rental mark, which indicates that the associated content is rental content, near an icon image of the content or dispose the rental mark so as to overlap with the icon image.

The information processing apparatus for processing content according to another exemplary embodiment of the present invention comprises: a storage device operative to store content and license information of the content; a start time derivation unit operative to derive a start time of a valid period from valid period information included in the license information; an end time derivation unit operative to derive an end time of the valid period from the valid period information; and a display processing unit operative to generate a display screen. The display processing unit comprises: a thumbnail image displaying unit operative to display a thumbnail image of the content; and a time information disposing unit operative to dispose the start time derived by the start time derivation unit and the end time derived by the end time derivation unit on display screen while associating the times with the thumbnail image.

The information processing apparatus for processing content according to yet another exemplary embodiment of the present invention comprises: a storage device operative to store content and license information of the content for a plurality of users; display processing unit operative to generate a display screen including an icon image for selecting content; and a controller operative, when an icon image is selected, to control the processing of content corresponding to the selected icon image. The controller is provided with a license usage specifying unit operative to determine whether or not a license of a user who selected the icon image is valid, and if the license is not valid, operative to specify a valid license of another user as a license to be used, and an instructing unit operative to give an instruction for processing the content utilizing the specified license.

The information processing apparatus for processing content according to yet another exemplary embodiment of the present invention comprises: a storage device operative to store content and license information of the content for a plurality of users; a display processing unit operative to generate a display screen including an icon image for selecting content, and a controller operative, when an icon image is selected, to control processing of content corresponding to the selected icon image. The controller is provided with: a license usage specifying unit operative to specify a license, which has the earliest valid time limit, included in valid licenses of other users as a license to be used; and an instructing unit operative to give instructions for processing the content utilizing the specified license.

Optional combinations of the aforementioned constituting elements and implementations of the invention in the form of methods, apparatuses, systems, recording mediums and computer programs may also be practiced as additional modes of the present invention.

Effect of the Invention

According to the present invention, technology for improving the user-friendliness of handling rental content can be provided.

BRIEF DESCRIPTION OF THE DRAWINGS

FIG. 3A shows an example of structures of folders for storing video content formed on a hard disk;

FIG. 3B shows another example of structures of folders for storing video content formed on a hard disk;

FIG. 4 shows an example of structures of folders for storing license files formed on a hard disk;

FIG. 10 shows an example of a confirmation screen;

DESCRIPTION OF THE REFERENCE NUMERALS

1 . . . contents purchasing system, 10 . . . information processing apparatus, 12 . . . output device, 18 . . . contents distribution server, 34 . . . hard disk drive, 40 . . . remote controller, 100 . . . main controller, 200 . . . instruction generating unit, 202 . . . menu screen generation-instructing unit, 204 . . . detailed information screen generation-instructing unit, 206 . . . playback instructing unit, 220 . . . valid period processing unit, 222 . . . playback time information acquiring unit, 224 . . . start time derivation unit, 226 . . . end time derivation unit, 228 . . . remaining time derivation unit, 240 . . . license information processing unit, 242 . . . license information acquiring unit, 244 . . . purchase type determining unit, 246 . . . valid period extracting unit, 260 . . . rental mark processing unit, 262 . . . valid time limit-determining unit, 264 . . . rental mark determining unit, 280 . . . playback controlling unit, 282 . . . license usage specifying unit, 284 . . . decoding instruction unit, 300 . . . storage device, 302 . . . content file, 304 . . . license file, 306 . . . key file, 310 . . . decoding unit, 320 . . . playback time writing unit, 340 . . . display processing unit, 350 . . . menu screen generating unit, 352 . . . icon image processing unit, 354 . . . folder image processing unit, 356 . . . rental mark disposing unit, 358 . . . time information disposing unit, 360 . . . confirmation screen generating unit, 370 . . . detailed information screen generating unit, 372 . . . thumbnail image displaying unit, 374 . . . owner information disposing unit, 376 . . . content information disposing unit, 378 . . . time information disposing unit, 380 . . . purchasing screen generating unit.

BEST MODE FOR CARRYING OUT THE INVENTION

Figure 1:
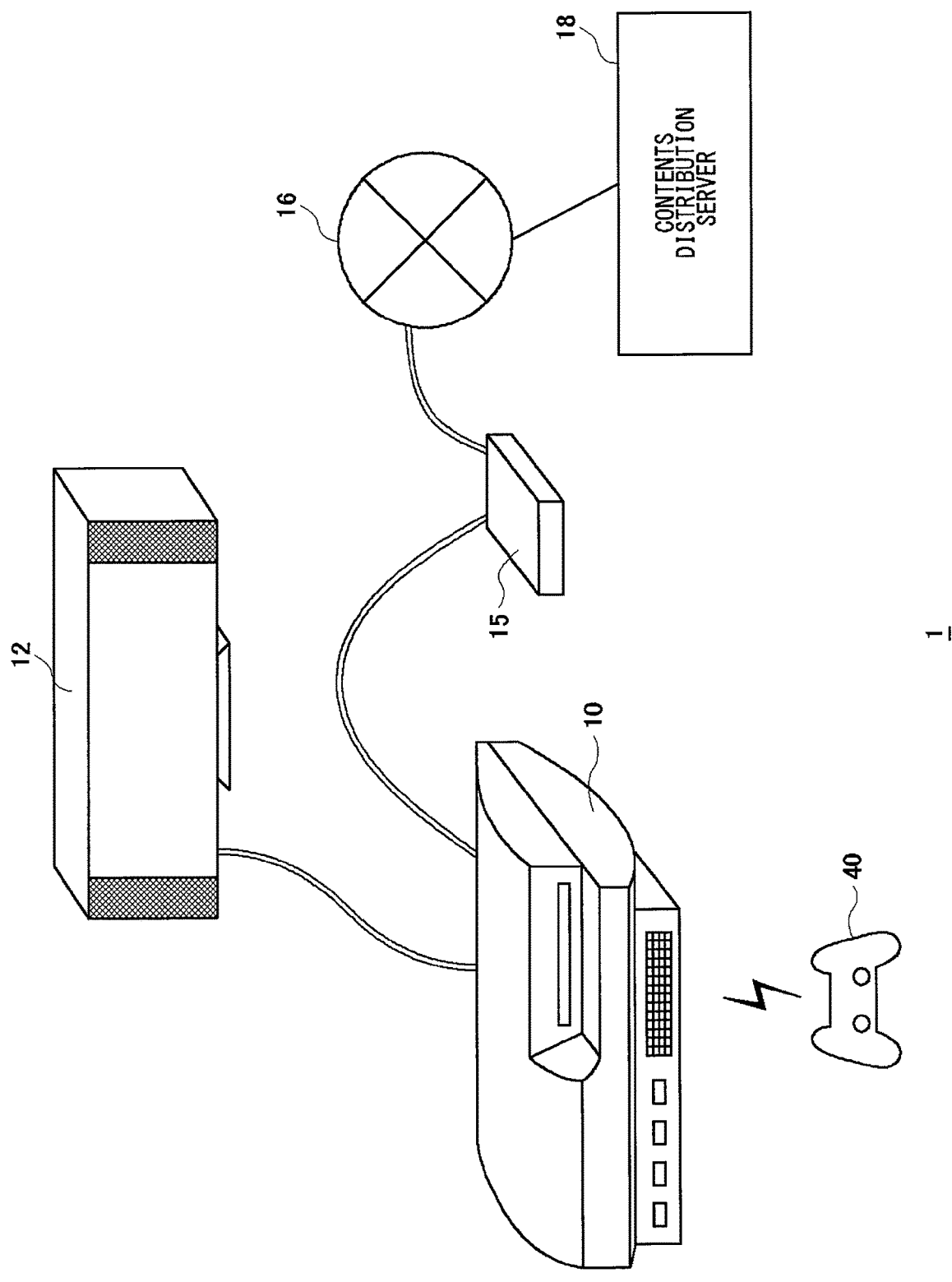
FIG. 1 shows a content purchasing system according to an exemplary embodiment of the present invention.

FIG. 1 shows a content purchasing system 1 according to an exemplary embodiment of the present invention. The content purchasing system 1 comprises a remote controller 40, an information processing apparatus 10 that processes content, and an output device 12 that outputs a processing result processed by the information processing apparatus 10. The remote controller 40 is an input interface device for allowing a user to input an operation into the information processing apparatus 10. Although the remote controller 40 transmits the operation input wirelessly, an interface device connected to the information processing apparatus 10 via a cable may be alternatively used. The output device 12 may be a television provided with a display for outputting images and a speaker for outputting sound. The output device 12 may be connected with the information processing apparatus 10 with a wire or cable or may be wirelessly connected with the information processing apparatus 10 by wireless LAN (Local Area Network) or the like. The information processing apparatus 10 is communicably connected, via a router 15, with a content distribution server 18 connected with a network 16 so that the information processing apparatus 10 can download desired content.

The content distribution server 18 is operated by a video distributing company or the like and provides the information processing apparatus 10 with coded video content file, license files that permit to watch and/or listen to the content, and key files for decoding the content file. The content distribution server 18 not only provide the information processing apparatus 10 with video content files as content files, but may also provide with music content files, game software files, or the like as content files. Explanation will be given below on an example where the content distribution server 18 provides a file relating to video content.

In the content purchasing system 1, the information processing apparatus 10 purchases desired video content according to the instruction from a user sent from the remote controller 40 and downloads the content from the content distribution server 18. As for the style of purchasing, there is a style where video content is bought and a style where content is rented. In the case where a user buys, the user can watch and/or listen to the content at any time. On the other hand, in the case where the content is rented, a user is required to watch and/or listen to the video content before the valid time limit passes. If the valid time limit has passed, the user can neither watch nor listen to the video content. The rented video content is managed by the information processing apparatus 10.

The information processing apparatus 10 is provided with not only a function for processing playback of the video content but may also be provided with a function for the playback of music content. The information processing apparatus 10 may also be provided with a function for processing game software and may be further provided with a function for processing other content. Therefore, the rental content in the exemplary embodiment is not limited to video content, but may also include a variety of content, such as, music content, game content, or the like.

Figure 2:
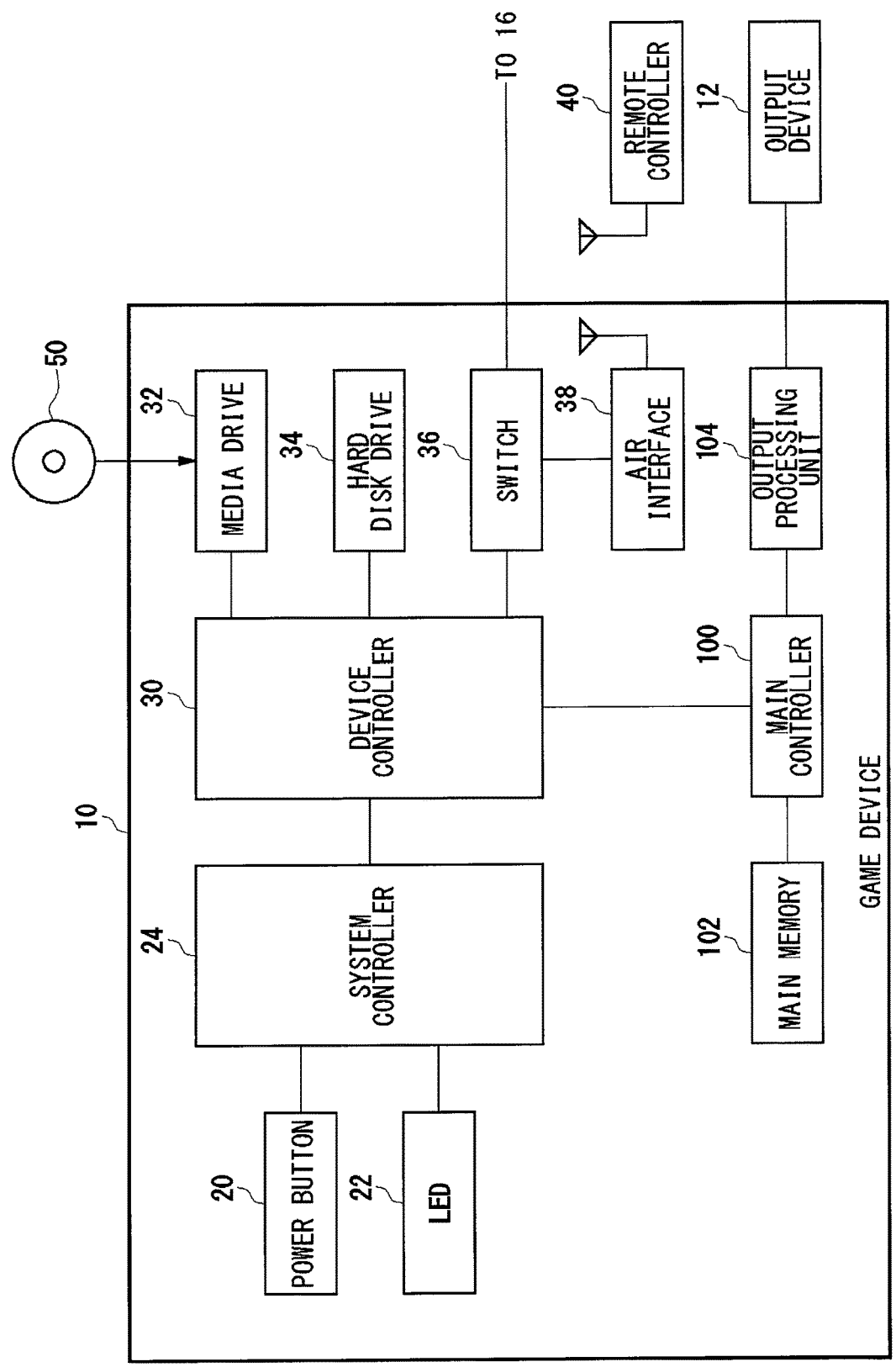
FIG. 2 shows a functional block diagram of an information processing apparatus.

FIG. 2 shows a functional block diagram of the information processing apparatus 10. The information processing apparatus 10 is provided with a power button 20, an LED 22, a system controller 24, a device controller 30, a media drive 32, a hard disk drive 34, a switch 36, an air interface 38, a main controller 100, a main memory 102, and an output processing unit 104.

The power button 20 is an input unit where a control input from the user is provided. The button is operated to turn the power of information processing apparatus 10 on or off. The LED 22 is turned on or off to indicate whether the power has been turned on or off. The system controller 24 detects the pushed state or the non-pushed state of the power button 20. Upon detecting the transition from the power-off state to the pushed state, the controller 24 activates the main controller 100, activates the boot sequence of the operating system, and turns the LED 22 on. When a power cable is connected to the information processing apparatus 10, the system controller 24 maintains the standby mode even in the power-off state and monitors whether the power button 20 is pushed.

Like a south bridge, the device controller 30 is configured as a LSI (large-scale integrated circuit) for executing the delivery of information between devices. As illustrated, devices, such as the system controller 24, the media drive 32, the hard disk drive 34, the switch 36, the main controller 100, or the like, are connected to the device controller 30. The device controller 30 controls the timing of data transfer by canceling differences in the electrical property of the devices or differences in data transfer rates thereof. The hard disk drive 34 drives a built-in hard disk and reads/writes data. The built-in hard disk functions as a storage device for storing data. The media drive 32 drives and recognizes, if a read-only recording medium 50 is attached to the drive, the recording medium 50 and reads out necessary data from the recording medium 50. The recording medium 50 may be a medium such as an optical disk, a magnet optical disk, or the like.

The switch 36 is an Ethernet switch (Ethernet is trademarked) and is a device connected with external devices via a wire or wirelessly and transmits and receives data. The switch 36 receives content files, license files, and key files from the content distribution server 18 via the network 16. Further, the switch 36 is connected with the air interface 38. The air interface 38 is connected with the remote controller 40 using a wireless communication protocol such as Bluetooth (registered trademark) protocol, the IEEE 802.11 protocol, or the like. Information on the user's operation input into the remote controller 40 is provided to the main controller 100 via the air interface 38, the switch 36, and the device controller 30.

The main controller 100 comprises a multi-core CPU, wherein one CPU is provided with one general-purpose processor core and a plurality of simple processor cores. The general-purpose processor core is referred to as a PPU (Power Processing Unit), and the rest of the processor cores are referred to as SPU (Synergistic-Processing Unit). In the main controller 100, an Operating System (hereinafter referred to as simply "OS") that provides the function and environment for effectively using the information processing apparatus 10 and for controlling the whole apparatus integrally is executed. The OS of the information processing apparatus 10 according to the present exemplary embodiment is provided with three layers, that is, a user layer, a kernel layer and a hypervisor layer, in this order from the upper layer to the lower layer. Software of the user layer, the kernel layer, and the hypervisor layer integrally functions as the "OS" of the information processing apparatus 10.

Upon activating the power using the power button 20, the system controller 24 provides the power to the main controller 100 and the output processing unit 104 via the device controller 30. After the power is provided to the main controller 100, the PPU firstly executes a boot loader of the OS so as to activate the hypervisor layer. Subsequently, the PPU activates the kernel layer of the OS and activates the user layer accordingly, so as to prepare for receiving data provided from the hard disk drive 34 or from the recording medium 50.

The main controller 100 comprises a memory controller connected to the main memory 102. The PPU is provided with a register and comprises a main processor as a main body for executing calculation. The PPU efficiently allocates a task, as a basic unit of processing in an application to be executed, to respective SPUs. PPU may execute a task by itself. SPU is provided with a register and comprises a sub processor as a main body for executing calculations and local memory as local storage. The main memory 102 and the local memory are provided as RAM (random access memory). The SPU is provided with a DMA (Direct Memory Access) controller as a controlling unit for its exclusive use. By transmitting data between the main memory 102 and the local memory, the SPU can process stream data at a high speed and can implement high-speed data transmission between the frame memory built in the output processing unit 104 and the local memory.

The output processing unit 104 is connected to the output device 12 and outputs image signals and sound signals that are the results of processing the application. The output processing unit 104 comprises a GPU (Graphics Processing Unit) that implements an image processing function. The GPU may adopt HDMI (High Definition Multimedia Interface).

In the information processing apparatus 10 according to the present exemplary embodiment, a variety of content, such as video content, music content, game content, or the like, is stored on the hard disk drive 34. This variety of content may be downloaded from the content distribution server 18, or may be installed from the recording medium 50. These content files are classified on the hard disk drive 34 by the use of folders.

FIG. 3A shows an example of the structure of the folders for storing video content formed on a hard disk. A video content file (XYZ.VDO) is stored in a VIDEO folder. FIG. 3B shows another example of the structure of the folders for storing video content formed on a hard disk. This folder structure is constituted as a hierarchy structure. The video content file (XYZ.VDO) is stored in a folder AA, formed in the VIDEO folder.

As described above, for respective rental content, the valid rental period during which the content can be enjoyed is determined. Therefore, the information processing apparatus 10 according to the present exemplary embodiment provides a GUI (Graphical User Interface) that effectively shows a user the existence of the rental content. This allows the user to watch and/or listen to the rental content without forgetting that he/she has acquired the rental content.

FIG. 4 shows an example of the structure of the folders for storing license files formed on a hard disk. A license file, (ABC.LCN), is stored in a folder (USER_ID), which is stored in the folder LICENSE. Since the (USER_ID) is the identification number of a user registered in the information processing apparatus 10, license files are stored in folders for respective users. The USER_ID may be the identification number of a user itself or may be a character string derived from the identification number of the user. License files are provided with information on the type of purchase model for the content and license information, such as the start time and end time of the valid period, or the like. By acquiring and retaining license files, the information processing apparatus 10 recognizes that a license for playback of the rental content is granted. Whether or not the license is valid is determined based on the license information and other conditions. More specifically, if the current time is before the valid time limit passes, the license is determined to be valid, and if the valid time limit has passed, the license is determined to be invalid.

In the content purchasing system 1, the valid period for playback of the content is set to a predetermined numbers of days, for example, fourteen days. The valid periods may be set for the respective content. As the start time of the valid period, the date and time when the content is downloaded may be set. Alternatively, a predetermined date and time after the content is downloaded may be set as the start time. Once content is played back, the information processing apparatus 10 resets the end time of the valid period of the played-back content to be twenty-four hours after the time of the first playback.

Although the information processing apparatus 10 can be shared and used by a plurality of users, as a general rule, the data of the respective users is stored in different folders on the hard disk drive 34. The name of a folder is formed so as to be associated with the user ID (identification information) of each user. The OS of the information processing apparatus 10 bans access to the folders by other users based on a user ID input when a user logs on, by which, a user cannot use the data of other users without permission. Therefore, the security of personal data can be retained.

Meanwhile, since video content is not personal data, it is preferable to allow other users besides the user who downloaded the content to be able to watch and/or listen to the content. For example, in case the members of a family share the information processing apparatus 10, it may be configured so that all the family members can watch the downloaded video content. In the case of renting video cassettes or DVDs from video stores, conventionally, the members of a family have been permitted to watch the videos in turn. Taking this into consideration, the information processing apparatus 10 allows a plurality of registered users to enjoy the video content.

Figure 5:
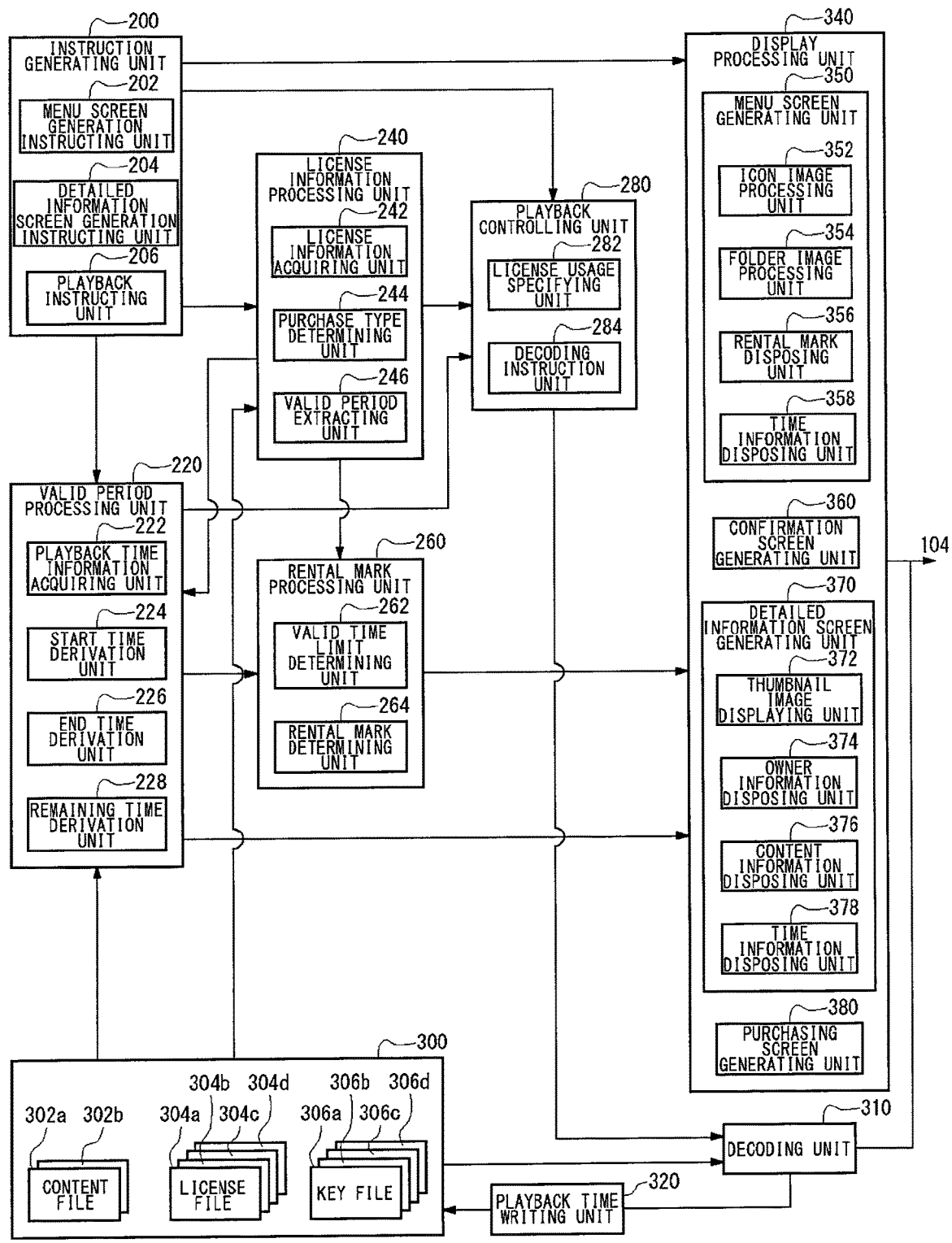
FIG. 5 mainly shows the interior structure of a main controller.

FIG. 5 mainly shows the interior structure of the main controller 100. The main controller 100 comprises an instruction generating unit 200, a valid period processing unit 220, a license information processing unit 240, a rental mark processing unit 260, a playback controlling unit 280, a decoding unit 310, a playback time writing unit 320, and a display processing unit 340. A storage device 300 is the hard disk drive 34 and stores a plurality of content files 302a~302b, a plurality of license files 304a~304d, and a plurality of key files 306a~306d. The key files 306 include key information for decoding the coded content files 302. In order to prohibit the playback of the downloaded content files 302 by another information processing apparatus, the key information is acquired via the content distribution server 18, is encrypted using the device ID of the information processing apparatus 10, and is stored.

The license file 304 and the key file 306 are given by the content distribution server 18 to a user who downloaded the content file 302. If a same content file 302 is downloaded a plurality of times by different users, the content file is overwritten and stored in the storage device 300. Meanwhile, the license file 304 and the key file 306 are given to the user who downloaded the content file 302. In this case, for one content file 302, license files 304 and key files 306 for a plurality of users are stored in the storage device 300, respectively.

The instruction generating unit 200 comprises a menu screen generation-instructing unit 202, a detailed information screen generation-instructing unit 204, and a playback instructing unit 206. The instruction generating unit 200 receives operation input or information on power activation from the remote controller 40, and the instruction generating unit 200 issues a predetermined instruction to the functional blocks for which it is necessary to send instructions, the blocks being selected from the valid period processing unit 220, the license information processing unit 240, the rental mark processing unit 260, the playback controlling unit 280, the decoding unit 310, and the display processing unit 340.

The menu screen generation-instructing unit 202 issues instruction information, which is for generating a menu screen for selecting content, to functional blocks for which it is necessary to send the instruction. This instruction information is formed, for example, when the power button 20 is pushed, when the screen is changed back from the detailed information screen to the menu screen, when the main screen is manipulated, or the like. The detailed information screen generation-instructing unit 204 issues instruction information for changing the screen from the menu screen to the detailed information screen of the content. The unit 204 issues the instruction information from the remote controller 40 to the functional blocks that need the instruction. This instruction information is formed, for example, when the operation for changing screens from the menu screen to the detailed content information screen is received from the remote controller 40. The playback instructing unit 206 issues instruction information for playing back content to the necessary functional blocks. This instruction information is generated when the playback of content is instructed on the menu screen.

The valid period processing unit 220 is provided with a playback time information acquiring unit 222, a start time derivation unit 224, an end time derivation unit 226, and a remaining time derivation unit 228. The valid period processing unit 220 executes a process for deriving, for the respective license information, the valid periods during which content can be enjoyed.

The playback time information acquiring unit 222 acquires, from the storage device 300, information on the time when the content is first played back based on the license. This first playback time information is written in the key file 306 associated with the license file 304, and the playback time information acquiring unit 222 acquires the first playback time information from the key file 306. In case the content is not played back under that license, the first playback time information is not included in the key file 306. The start time derivation unit 224 derives the start time of the valid period of the content. The end time derivation unit 226 derives the end time of the valid period of the content. The end time of the valid period may also be referred to as "valid time limit" in this specification. The remaining time derivation unit 228 derives the remaining time until the valid time limit.

The license information processing unit 240 is provided with a license information acquiring unit 242, a purchase type determining unit 244, and a valid period extracting unit 246. The license information processing unit 240 performs processing on license information.

The license information acquiring unit 242 acquires license information from the license file 304 stored in the storage device 300. If a license file 304 exists, the license information acquiring unit 242 recognizes that the content associated with the license file 304 is granted a license. The purchase type determining unit 244 determines the type of purchase from the purchase type information included in the license information. As described above, the type of purchase can be buying or renting. The valid period extracting unit 246 extracts, if the type of purchase of the content is rental, the start time and end time of the valid period included in the license information.

The rental mark processing unit 260 performs processing on rental marks to be disposed near the icon image of the content or to be disposed while overlapped on the icon image on the menu screen. The rental marks are marks for showing users that the content is rental content.

A valid time limit-determining unit 262 determines whether or not the valid time limit has already been reached. A rental mark determining unit 264 selects and determines, from a plurality of types of rental marks, a rental mark to be disposed near the icon image of the content or to be disposed while overlapped on the icon image.

The playback controlling unit 280 receives an instruction for playback, and then performs a process for controlling the playback of the content. A license usage specifying unit 282 specifies a license to be used for the playback of the content. The decoding instruction unit 284 instructs the decoding unit 310 to use the specified license and perform the process of decoding the content.

The decoding unit 310 uses the specified license and performs the process of decoding the content. In the case where the process of decoding while using that license is performed for the first time, the playback time writing unit 320 writes the first playback time information into the corresponding key file 306.

The display processing unit 340 is provided with a menu screen generating unit 350, a confirmation screen generating unit 360, a detailed information screen generating unit 370, and a purchasing screen generating unit 380. The display processing unit 340 performs the process of generating display images in the output device 12.

The menu screen generating unit 350 is provided with an icon image processing unit 352, a folder image processing unit 354, a rental mark disposing unit 356, and a time information disposing unit 358. The menu screen generating unit 350 receives an instruction for generating the menu screen from the menu screen generation-instructing unit 202 and then generates a menu screen for selecting the content.

The icon image processing unit 352 disposes the icon images of the content on the menu screen. If a user instructs one of the icon images to play back, the playback instructing unit 206 generates the playback instruction for the content associated with that icon image. The folder image processing unit 354 disposes a folder image on the menu screen. The rental mark disposing unit 356 disposes a rental mark near the icon image or disposes the rental mark so as to be overlapped with the icon image. Further, the rental mark disposing unit 356 disposes a rental mark near the image of a folder or disposes a rental mark so as to be overlapped with the folder image, wherein the folder is a folder including the rental content or a folder positioned in upper level of the folder including the rental content in a hierarchy structure of folders. The time information disposing unit 358 disposes information on the end time of the valid period (valid time limit), while associating the information and the icon image of the rental content with each other.

The confirmation screen generating unit 360 generates a confirmation screen for asking a user whether the user agree to start the playback of the content.

The detailed information screen generating unit 370 is provided with a thumbnail image displaying unit 372, an owner information disposing unit 374, a content information disposing unit 376, and a time information disposing unit 378. The detailed information screen generating unit 370 generates a detailed information screen that indicates information on the content, valid periods, or the like.

The thumbnail image displaying unit 372 disposes thumbnail images for specifying content at the predetermined location. The owner information disposing unit 374 disposes information on the owner of the license in the detailed information screen. The content information disposing unit 376 disposes information relating to the content in the detailed information screen. The time information disposing unit 378 disposes information relating to the valid period in the detailed information screen.

The elements depicted in FIG. 5, as functional blocks for performing various processes, are implemented in hardware by CPUs (Central Processing Unit), memory, or other LSI's, and in software by programs, etc., loaded into the memory. As mentioned before, the main controller 100 is provided with a single PPU and a plurality of SPUs. The PPU and the SPUs can form functional blocks either alone or in combination. Therefore, it will be obvious to those skilled in the art that the functional blocks may be implemented in a variety of manners by hardware only, software only, or a combination of thereof.

Figure 6:
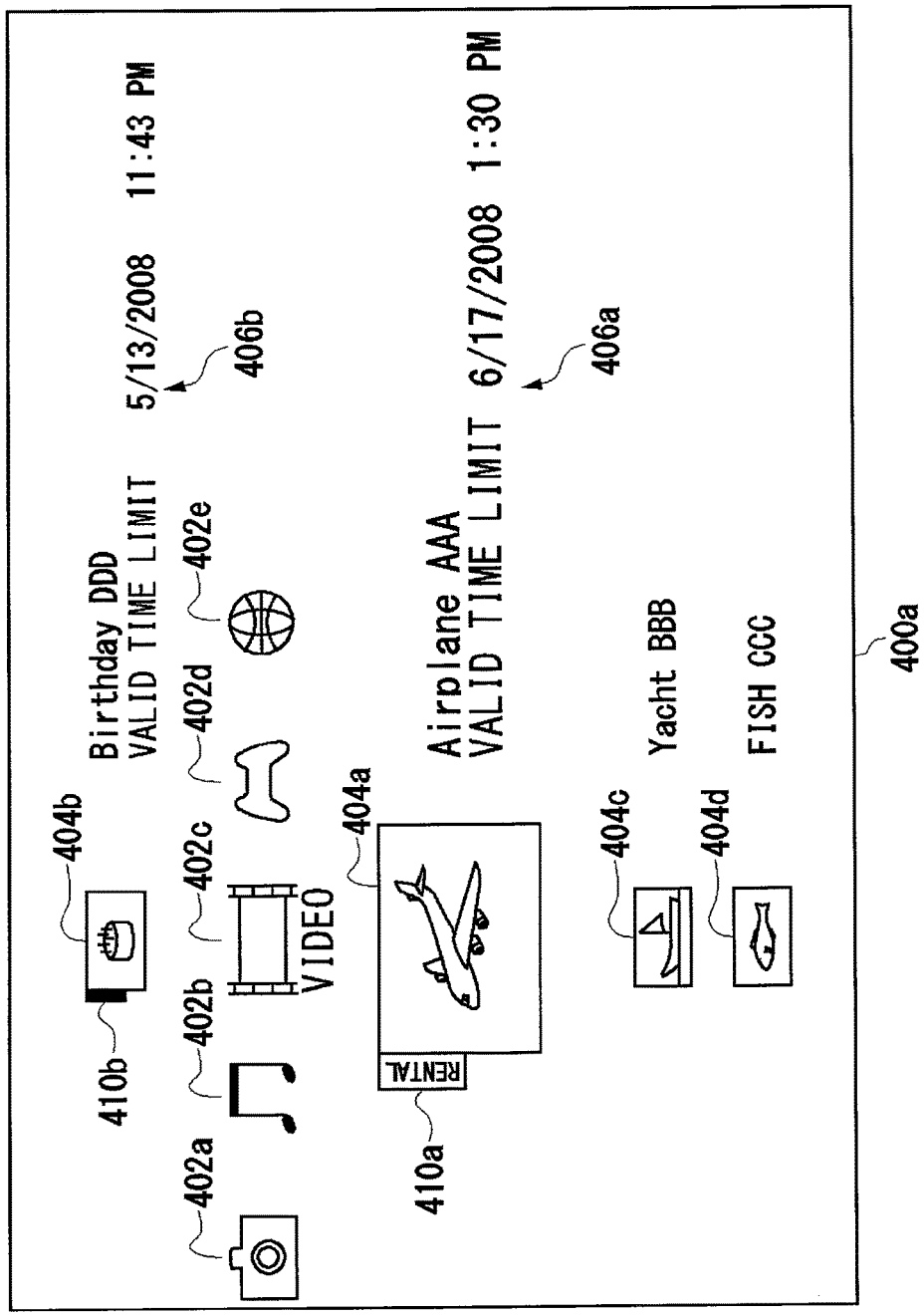
FIG. 6 shows an example of a menu screen displayed on an output device.

FIG. 6 shows an example of a menu screen 400*a* displayed on the output device 12. In the menu screen 400*a*, a plurality of folder images 402*a*~402*e* are disposed in a horizontal array. Among those images, the folder image 402*b* shows a folder for music content, the folder image 402*c* shows a folder for video content, and the folder image 402*d* shows a folder for game content. Icon images 404*a*~404*b* are disposed in a vertical array. By manipulating the remote controller 40, scrolling, and moving a desired icon to the position of focus region, a user can allow the process associated with the icon to be executed. In an example shown in FIG. 6, the icon image 404*a* of video content is disposed in the focus region. If a user pushes a predetermined button on the remote controller 40, the instruction for playback is issued, and one video having the title "AiraplaneAAA" among the video content is played back, accordingly. An explanation will be given below on the generation processing of the menu screen 400*a* while referring to FIG. 5.

The menu screen generation-instructing unit 202 issues an instruction for generating the menu screen, and then the menu screen generating unit 350 generates the menu screen for selecting content. More specifically, the folder image processing unit 354 determines the position to display the highest level folder images 402*a*~402*e* and disposes the images on the menu screen. The icon image processing unit 352 searches for video content by referring to the VIDEO folder on the hard disk drive 34 and specifies the icon image 404 to be displayed. The icon image processing unit 352 determines the display position of the icon image 404 of the specified video content and disposed the images on the menu screen. The icon image 404 is, for example, included in the content file 302, and the icon image processing unit 352 acquires the icon image from content files shown in FIG. 3A or 3B. If the folder image 402*b*, which is a folder of music content, is disposed on the position of the folder image 402*c* in the menu screen 400*a*, the icon image processing unit 352 searches for music content by referring to the MUSIC folder on the hard disk drive 34 and specifies the icon image to be displayed.

In this process, in the license information processing unit 240, the license information acquiring unit 242 acquires, from the license file 304, license information on the user who logs on. As shown in FIG. 4, the license information is retained in a folder specified by a user ID. The license information acquiring unit 242 acquires license information retained by a user based on the user ID of the user. By generating the file name of the license file 304 using content ID, it becomes easy to read out the license file 304 associated with the content. The purchase type determining unit 244 determines whether or not the content is rental content, which has a valid period for enjoying that content, from purchase type information included in the license information. Purchase type information is information representing either buying or renting the content and may be set, for example, as a flag value of 0 or 1. In the content purchasing system 1 according to the present exemplary embodiment, the license information acquiring unit 242 checks, based on the user ID, the existence or nonexistence of the license file 304 of the video content to be displayed by the icon image 404 on the menu screen 400a. If the license file 304 exists, the video content is confirmed to be rental content. If the content is determined to be rental content, the valid period extracting unit 246 acquires the valid period information indicating the start time of the valid period and the end time of the valid period from the license information and provides the valid period information to the valid period processing unit 220.

In the menu screen 400a shown in FIG. 6, the valid time limit information 406 is displayed while associated with the icon image 404. Therefore, in the process of generating the menu screen 400a, it is necessary to derive only the end time of the valid period (valid time limit) and, according to circumstances, the remaining time of the valid period. On the other hand, in a detailed information screen 420, which will be described later in detail in relation with FIG. 9, the start time of the valid period and the remaining time of the valid period are displayed in addition to the end time of the valid period. The process if deriving that time information is performed in the valid period processing unit 220. Thus, in order to avoid redundant explanation, an explanation will be given below on a process wherein the valid period processing unit 220 derives the start time, the end time, and the remaining time.

In the valid period processing unit 220, when content has not yet played back, the start time derivation unit 224 derives the start time of the valid period of the content from the provided valid period information. The end time derivation unit 226 derives the end time of the valid period of the content from the provided valid period information. The start time and the end time derived in this process are same with the start time and the end time included in the valid period information, respectively. As a general rule, the remaining time derivation unit 228 calculates the remaining time as time from the present time to the end time.

Figure 7:
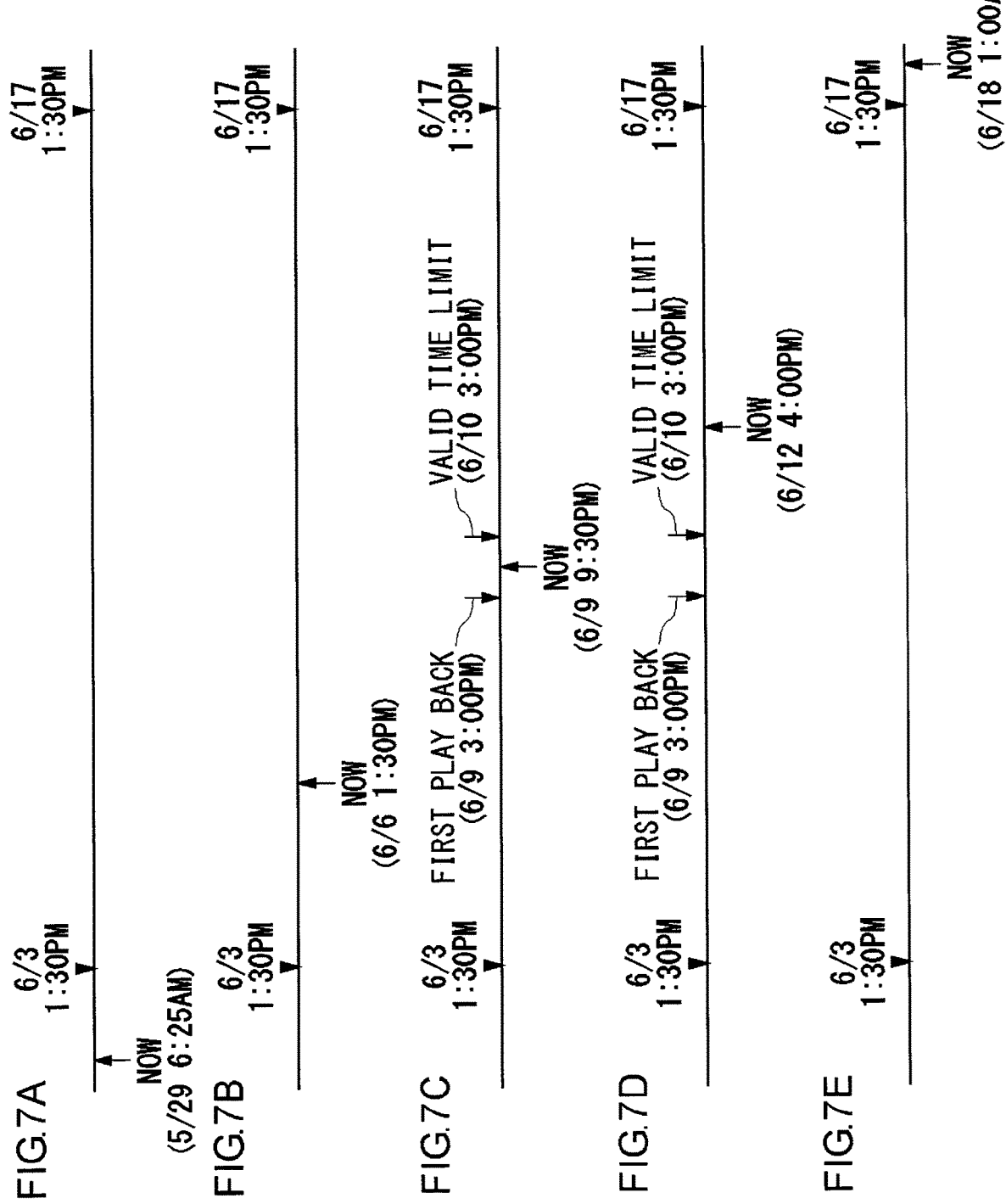
FIGS. 7A-E are time charts for explaining the process of deriving a valid period.

In the content purchasing system 1, as described above, once content is played back, the end time of the valid period of that content is reset to the time that is twenty-four hours after the playback time. That is, after the content is played back, the first playback time is set as the start time of the valid period, and the end time of the valid period is set to be twenty-four hours after the start time. An explanation will be given below on process of deriving the valid period while referring to FIG. 7.

FIGS. 7A-E are time charts for explaining the process of deriving the valid period. In FIGS. 7A-E, "NOW" indicates the time when the valid period is derived (herein after, referred to as a present time). The process of deriving the valid period is performed every time a display screen that displays time information is switched to another screen. It is assumed the start time included in the valid period information is 3 June 1:30 PM. and the end time is 17 June 1:30 PM.

FIG. 7A shows the status where the present time is before the start time that is included in the valid period information. In this case, a user cannot watch and/or listen to the content. The start time derivation unit 224 sets the start time included in the valid period information as the start time of the valid period. The end time derivation unit 226 sets the end time included in the valid period information as the end time of the valid period. The remaining time derivation unit 228 sets the time from the start time to the end time as the remaining time.
START TIME: 3 June, 1:30 PM
END TIME: 7 June, 1:30 PM
REMAINING TIME: 14 days FIG. 7B shows the status where the present time is after the start time included in the valid period information and the content has not yet been played back. Since the content has not yet been played back, the start time derivation unit 224 sets the start time included in the valid period information as the start time of the valid period. The end time derivation unit 226 sets the end time included in the valid period information as the end time of the valid period. The remaining time derivation unit 228 sets the time period from the present time to the end time as the remaining time.
START TIME: 3 June, 1:30 PM
END TIME: 17 June, 1:30 PM
REMAINING TIME: 11 days FIG. 7C shows a status where the present time is within twenty-four hours after the content was first played back. Referring to FIG. 5, the decoding unit 310 decodes and plays back the content using the license, and then the playback time writing unit 320 writes the first playback time information into the key file 306. The valid period processing unit 220 is activated at the present time, the playback time information acquiring 222 acquires the first playback time information from the key file 306 corresponding to the license and provides the start time derivation unit 224 and the end time derivation unit 226 with the first playback time information, accordingly. The start time derivation unit 224 receives the first playback time information and then sets the first playback time as the start time of the valid period. The end time derivation unit 226 receives the first playback time information and then sets the time to a predetermined time (here, for example, twenty-four hours) after the first playback time as the end time of the valid period. If the time, which is twenty-four hours after the first playback time, is later than the original end time included in the valid period information, the end time is set to be the end time included in the valid period information. The remaining time derivation unit 228 sets a time period from the present time to the end time as the remaining time.
START TIME: 9 June, 3:00 PM
END TIME: 10 June, 3:00 PM
REMAINING TIME: 17 hours 30 minutes FIG. 7D shows a status where the first playback has already been performed and where the present time is later than the end time. The start time derivation unit 224 sets the first playback time as the start time of the valid period. The end time derivation unit 226 sets a time that is twenty-four hours after the first playback time as the end time of the valid period. Since the present time is later than the end time, the remaining time derivation unit 228 determines the status to be "valid period expired".
START TIME: 9 June, 3:00 PM
END TIME: 10 June, 3:00 PM
REMAINING TIME: valid period expired FIG. 7E shows a status where the end time has passed already without the content ever having been played back.

Since the present time is later than the end time, the remaining time derivation unit 228 determines the status to be "time period expired".
START TIME: 3 June, 1:30 PM
END TIME: 17 June, 1:30 PM
REMAINING TIME: valid period expired Referring back to FIG. 5, the valid period processing unit 220 performs a process relating to the valid period. As described above, in the process of generating the menu screen 400a, the start time derivation unit 224 may not function since the start time of valid period is not necessary for the process. The end time derived by the end time derivation unit 226 and the remaining time derived by the remaining time derivation unit 228 are provided to the rental mark processing unit 260. The end time is provided also to the display processing unit 340.

In the rental mark processing unit 260, the valid time limit-determining unit 262 receives the end time and then determines whether or not the end time (valid time limit) has already passed while referring to the present time. This determination may be performed based on the remaining time, alternatively.

The rental mark determining unit 264 receives the determination result made by the valid time limit-determining unit 262 and determines the rental mark to be allocated to the rental content. More specifically, the rental mark determining unit 264 allocates the first rental mark to the rental content for which the valid time limit has not yet been reached and allocates the second rental mark to rental content for which the valid time limit has already passed. In the menu screen 400a shown in FIG. 6, a rental mark 410a is allocated to the rental content having the title "AirplaneAAA" for which the valid time limit has not yet been reached, and a rental mark 410b is allocated to the rental content having the title "BirthdayDDD" for which the valid time limit has already passed. Allocated rental marks are provided to the rental mark disposing unit 356, and the rental mark disposing unit 356 disposes the rental marks 410 near the respective icon images 404 or disposes the rental marks 410 so that the marks overlap with the respective icon images. In the menu screen 400a, the rental mark disposing unit 356 disposes the rental marks 410 along the left edge of the icon images 404.

By allowing the rental mark disposing unit 356 to attach rental marks 410a to an icon image 404a for which the valid time limit has not yet come, a user can easily recognize the existence of rental content that is available for watching and/or listening to and can have the incentive to watch and/or listen to the content.

Further, by allowing the rental mark disposing unit 356 to attach rental marks 410b to icon images 404b for which the valid time limit has already passed, a user can easily recognize the existence of non-valid rental content. Thus, a trigger for enlarging the capacity of the storage device 300, for example, by deleting the content files, can be given to the user.

The rental mark determining unit 264 may allocate different rental marks for rental content for which remaining time is equal to or more than a predetermined period before the valid time limit and for rental content for which the remaining time is less than the predetermined period, respectively. For example, it is preferable to give emergency notice to a user of the existence of rental content for which the remaining time is less than twenty-four hours before the valid time limit. Therefore, for rental content for which remaining time is more than twenty-four hours before the valid time limit, a still image rental mark may be allocated.

On the other hand, for rental content for which the remaining time is less than twenty-four hours before the valid time limit, a moving image rental mark may be allocated. For example, by allocating a blinking rental mark, the attention of a user can be called. Alternatively, by allocating an appealing rental mark, such as a mark in luminescent color or the like, the attention of the user can also be called.

The time information disposing unit 358 receives the end time from the end time derivation unit 226 and then disposes the end time (valid time limit) information 406 on the menu screen 400a while associating the information with the icon image 404. For example, disposing the valid time limit information 406 at the same horizontal level on the screen with an icon image 404 clearly indicates that the information has a relationship with the icon image 404. In the menu screen 400, the valid time limit information 406b for which the time limit has already passed and the valid time limit information 406a for which the time limit has not yet been reached are disposed while associated with the icon image 404b and the icon image 404a, respectively.

Figure 8:
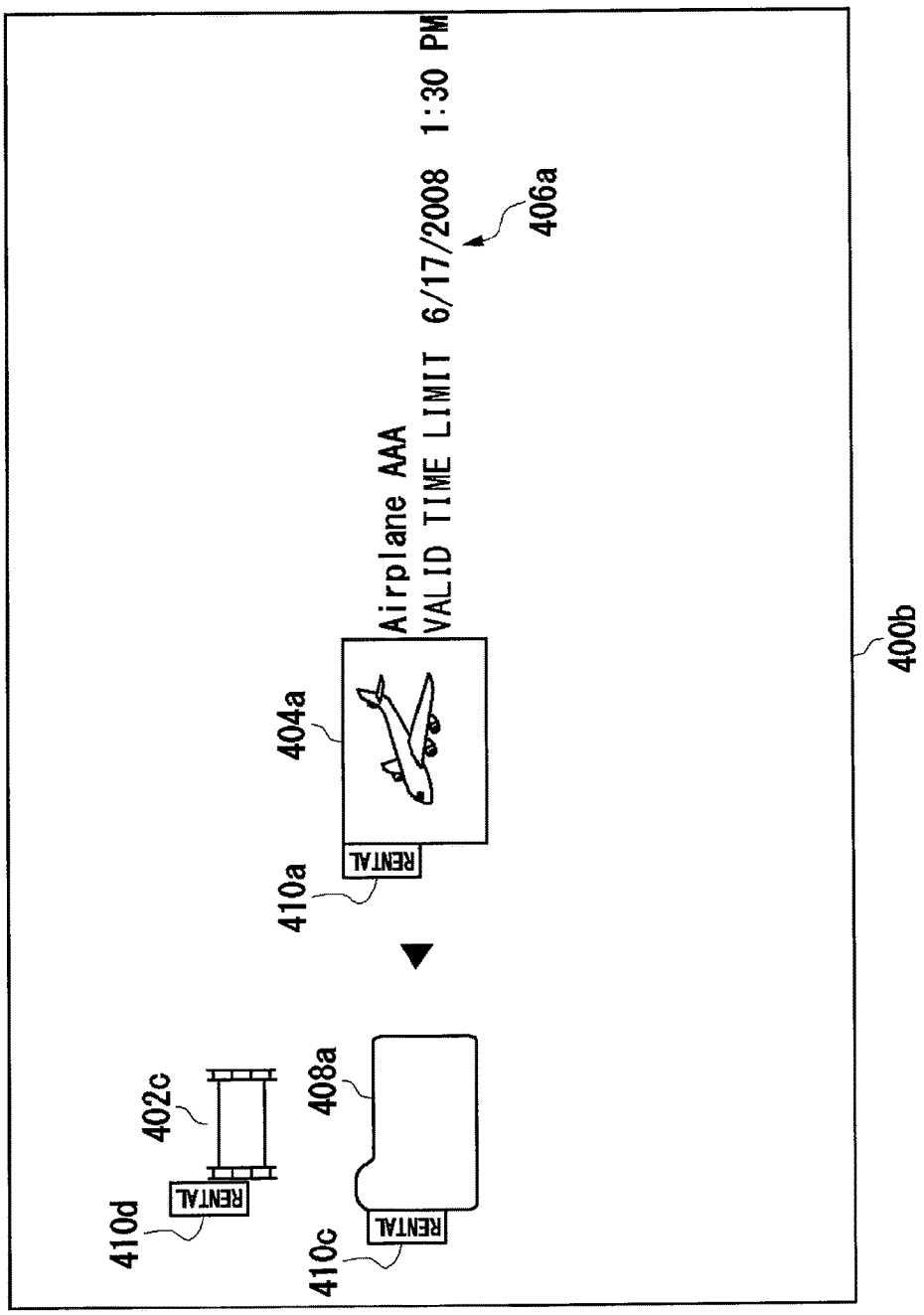
FIG. 8 shows another example of the menu screen displayed on the output device.

FIG. 8 shows another example of the menu screen 400b displayed on the output device 12. In this example, folder structures are formed as a hierarchical structure. On the menu screen 400b, the rental content is included in a folder that is positioned at a layer lower than a folder positioned at the top layer. More specifically, the rental content is stored in a folder corresponding to the folder image 408a. The rental mark determining unit 264 allocates a rental mark to the folder that includes the rental content, and the rental mark disposing unit 356 disposes the rental mark 410c near the folder image 408a or disposes the mark so that the mark overlaps with the folder image 408a. The rental mark determining unit 264 also allocates a rental mark to a folder positioned at the highest level in the hierarchical structure of the folder that includes rental content. The rental mark disposing unit 356 disposes the allocated rental mark 410d near the folder image 402c or disposes the mark so that the mark overlaps with the folder image 402c.

In case where rental content is included in a folder that is positioned at a lower layer of the folders of the hierarchical structure, a user can not recognize the rental content without opening the folders of the hierarchical structure one by one. Thus, by attaching rental marks 410 also to the respective folders at their respective layers constituting the hierarchical structure, a user can easily recognize the existence of the rental content.

Figure 9:
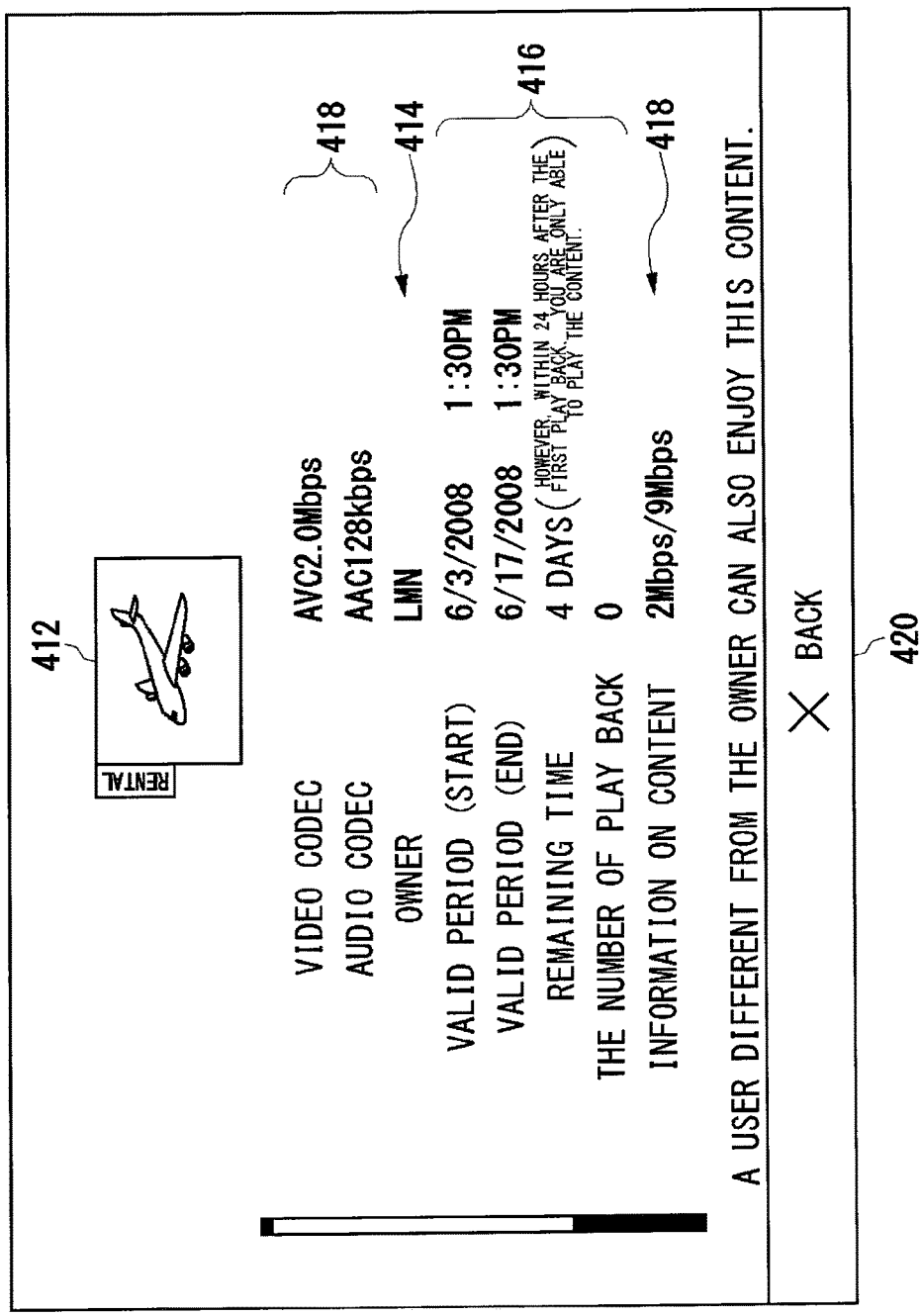
FIG. 9 shows an example of a detailed information screen displayed on the output device.

FIG. 9 shows an example of the detailed information screen 420 displayed on the output device 12. A user manipulates the remote controller 40 in a predetermined manner on the menu screen 400a, the detailed information screen generation-instructing unit 204 then issues an instruction for generating the detailed information screen, and the detailed information screen generating unit 370 generates the detailed information screen 420 including content information, valid period information, or the like. The valid period processing unit 220 receives the instruction for generating the detailed information screen, then performs processing of valid period, derives the start time, the end time, and the remaining time, and provides the derived times to the detailed information screen generating unit 370, accordingly The thumbnail image displaying unit 372 generates the thumbnail image 412 of content and disposes the image on a predetermined position on the detailed information screen 420. For example, the thumbnail image displaying unit 372 may acquire the icon image 404a and the rental mark 410a from the menu screen 400a and may generate the thumbnail image 412. Further, the thumbnail image displaying unit 372 may acquire a predetermined image from the content file 302 and may generate the thumbnail image 412. This image to be acquired may be a still image or may be a moving image. The thumbnail image displaying unit 372 may search for video content by referring to the VIDEO folder on the hard disk drive 34 in a similar manner as that performed by the icon image processing unit 352 and may extract an icon image to be displayed as a thumbnail image. In this case, the rental mark disposing unit 356 attaches a rental mark to the thumbnail image 412.

The owner information disposing unit 374 disposes owner information 414 on the detailed information screen 420 while associating the owner information with the thumbnail image 412. The owner information disposing unit 374 acquires the user ID as the owner information 414. The content information disposing unit 376 disposes the content information 418 on the detailed information screen 420 while associating the content information with the thumbnail image 412. The content information disposing unit 376 acquires the content information 418 from the content file 302. The time information disposing unit 378 disposes the start time, the end time, and the remaining time, provided by the valid period processing unit 220, on the detailed information screen 420 while associating the times with the thumbnail image 412. The time information disposing unit 378 may dispose the number of times it has been played back on the detailed information screen 420. The thumbnail images 412 are disposed in the upper center and the owner information 414, time information 416, and the content information 418 are disposed under the thumbnail images 412.

In case the remaining time becomes less than a predetermined time, for example, less than forty-eight hours, the time information disposing unit 378 may change the format for displaying the remaining time from that which uses days at a unit to that which uses hours at a unit. In case that the remaining time is closing in on the end time, by applying hours as a unit for displaying time, this strengthens the incentive to watch and/or listen to the content. Further, the time information disposing unit 378 may apply colors different from other displayed information in order to display the remaining time so as to be appealing or may apply a font different from other displayed information in order to display the remaining time so as to be appealing, in case that the remaining time becomes less than the predetermined time.

A user can check the start time of the valid period and the remaining time of the valid period by looking at the detailed information screen 420. In the menu screens 400a and 400b, although the valid time limit is indicated, the start time and the remaining time are not presented. A user can check whether or not content has already been played back by looking at the start time. Particularly, in case that the same rental mark is used as a rental mark for content that has not yet been played back and as a rental mark for content that has already been played back, by presenting the remaining time, a user can know, for example, that another user has watched and/or listened to the content. In addition, by looking at the remaining time, a user can confirm that he/she should watch and/or look at the content shortly. Particularly, in case that the rental marks are not changed based on the remaining time, by showing the remaining time, this improves the incentive to watch and/or listen to the content.

In case there is license information of a plurality of users for the same content, the time information disposing unit 378 disposes time information 416 for respective license owners on the detailed information screen 420. As described above, since the file names of license files 304 are created using the content IDs, the time information disposing unit 378 refers to a folder specified by respective user IDs included in the LICENSE folder shown in FIG. 4 and searches for the license file 304 of the same content. This allows the time information disposing unit 378 to acquire another license file 304 of the same content owned by another user besides the logged-on user.

In this process, the start time derivation unit 224 derives the start time of the valid period for each license owner based on valid period information or the first processing time when the content was first played back included in license information of each license owner. The end time derivation unit 226 derives the end time of the valid period for each license owner based on valid period information or the first processing time when the content was first played back included in license information of each license owner. This allows the time information 416 for a plurality of license owners to be disposed and displayed on the detailed information screen 420. Further, the owner information disposing unit 374 identifies the name of the license owner based on the name of the USER_ID folder in which the license file 304 is stored and disposes the name of the license owner as the owner information 414 above the time information 416. Thus, a plurality of sets of owner information 414 and time information 416 are disposed so that a set for the logged-on user comes up on top and the sets of other users come up below the logged-on user. This allows the logged-on user to recognize that there is a plurality of pieces of license information for one file of the content and to recognize concurrently whether the content is available for watching and/or listening to.

A user instructs an icon image 404 on the menu screens 400a or 400b to play back, and then the playback instructing unit 206 issues an instruction for playing back the content corresponding to the icon image 404a. The playback controlling unit 280 receives the instruction for playback and controls a process for playing back the content, accordingly.

The license usage specifying unit 282 determines whether the license of the user who has instructed the icon image 404 to play back is valid. If the license is not valid, the license usage specifying unit 282 specifies a valid license of another user as a license to be used. Whether or not the license is valid is determined by whether or not the valid time limit has come already. For example, suppose a case where the icon image 404b is moved to the focus region and is instructed to play back. Since the valid time limit for the content corresponding to the icon image 404b has passed already, the license for video content having the title "BirthdayDDD" is determined to be invalid. If there is no license information for another user corresponding to the same content, i.e., there is no other user who has downloaded this content, the license usage specifying unit 282 determines that the content is not available for playback.

Upon receiving the instruction for playing back, the end time derivation unit 226 derives the valid time limit and provides the time limit to the license usage specifying unit 282. The license usage specifying unit 282 compares the derived valid time limit and the present time and then determines whether the license is valid. In the content purchasing system 1, it is allowable that a user can also play back the content that is downloaded by another user. Thus, even if the user's own license is not valid, the user can watch and/or listened to the content as long as the license of another user is valid. The decoding instruction unit 284 uses the license specified by the license usage specifying unit 282 and instructs the decoding unit 310 to process the decoding of the content. The decoding unit 310 reads out the content file 302, acquires key information from the key file 306, and decodes the content file, accordingly.

The license usage specifying unit 282 may specify a license that has the earliest valid time limit, from among the licenses of other users, as a license to be used. This enables one to provide a highly convenient rental service for users who share the information processing apparatus 10 without placing ahead a valid time limit for the whole device.

In case the license usage specifying unit 282 specifies the license of another user as a license to be used, the confirmation screen generating unit 360 may generate a confirmation screen for asking the user whether the processing of the content may be started.

FIG. 10 shows an example of the confirmation screen 430. If a user instructs the icon image 404b to play back, he/she can play back the video content having the title "BirthdayDDD" by using the license of another user. However, the user may not be aware that he/she is using the license of another user. Therefore, by presenting the user with the confirmation screen 430, the user can avoid the situation where he/she uses the license of another by mistake.

The license usage specifying unit 282 may specify a license that has the earliest valid time limit as a license to be used, regardless of whether the license belongs to the logged-on user or belongs to another user. This allows one to implement a highly convenient rental service for users who share the information processing apparatus 10 without placing ahead a valid time limit for the whole device.

If there is no valid license of another user when an instruction for playing back is given to the icon image 404b of rental content with which the valid time limit is expired, the purchasing screen generating unit 380 may generate a purchase screen for the content. This allows a user who would like to watch and/or listen to the content to easily purchase the content once more. If the license usage specifying unit 282 determines that no valid license exists for the content to which the playback instruction is given, a purchase instructing unit (not shown) transmits a request for acquiring the license file 304 of the video content "BirthdayDDD" to the content distribution server 18. This request for acquiring includes information for identifying the "BirthdayDDD". The content distribution server 18 receives the request for acquiring the license file 304 of the content "BirthdayDDD", and then generates data on composition of the content purchasing screen and transmits the data to the information processing apparatus 10, accordingly. The purchasing screen generating unit 380 receives the data and generates the purchasing screen of the content. A user can download the license file 304 by pushing down a predetermined button (e.g., a purchase button) in this purchasing screen. In this process, the content file 302 may be downloaded along with the license file. According to the procedure described above, upon instructing the playback of content, a user can purchase the content with an easy procedure. This process may be configured so that the user can choose either buying or renting as a purchasing type.

Figure 11:
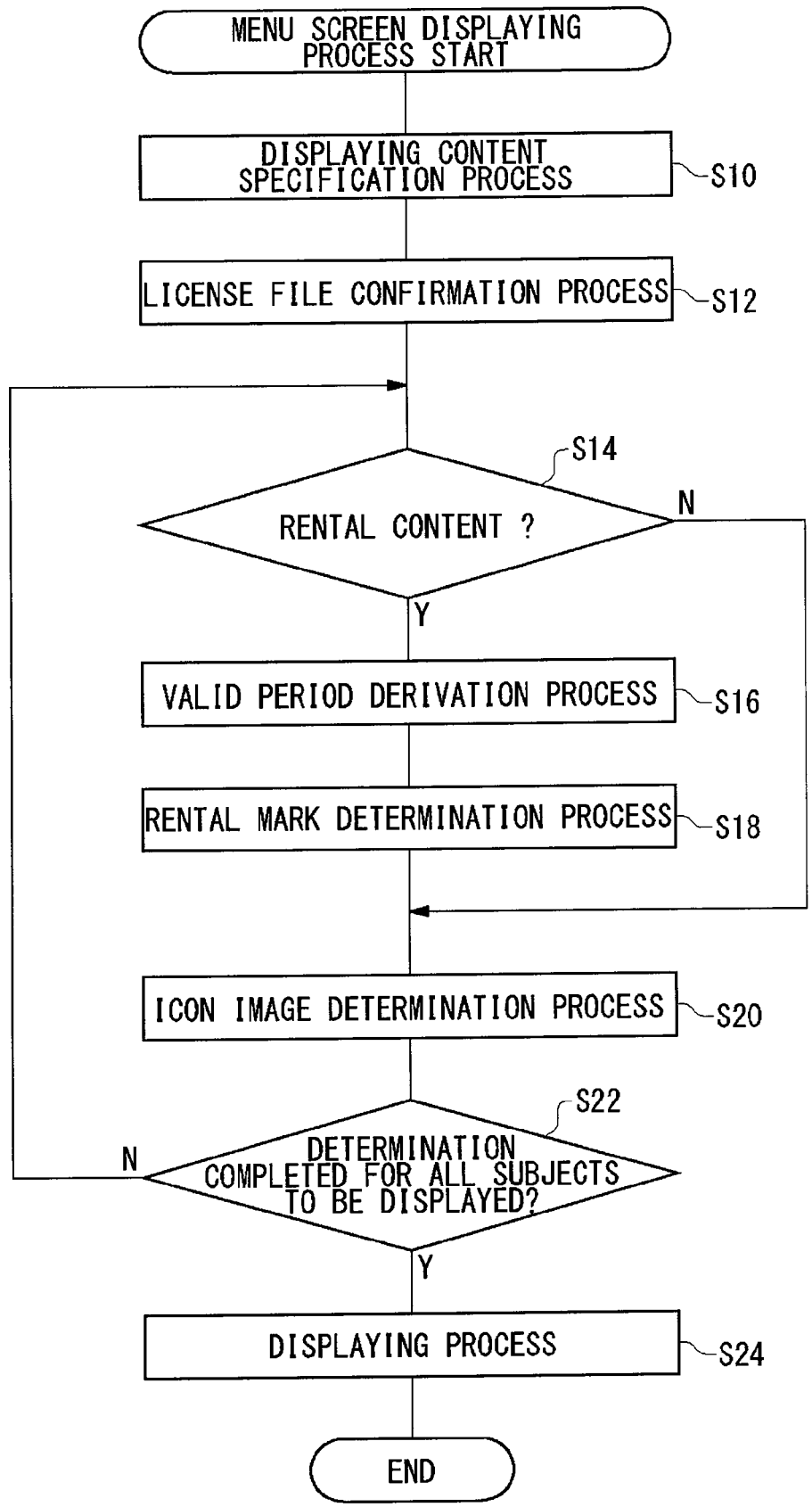
FIG. 11 is a flowchart showing the process of displaying the menu screen.

FIG. 11 is a flowchart showing the process of displaying the menu screen. An explanation will be given below on the process where the menu screen 400a shown in FIG. 6 is displayed. The menu screen generation-instructing unit 202 issues an instruction for generating a menu screen, then the icon image processing unit 352 searches for video content by referring to the VIDEO folder on the hard disk drive 34 and specifies an icon image 404 to be displayed (S10). In this process, in the license information processing unit 240, the license information acquiring unit 242 checks the existence or nonexistence of the license file 304 of the video content corresponding to the icon image 404 to be displayed on the menu screen 400a (S12). If the license file 304 exists, the purchase type determining unit 244 determines whether or not the content is rental content that has a valid period of enjoyment (S14). If the content is not rental content (N in S14), the icon image processing unit 352 determines an icon image 404 that indicates the existence of the content (S20). On the other hand, if the content is rental content (Y in S14), the valid period processing unit 220 derives the valid period for that rental content (S16). The rental mark determining unit 264 determines a rental mark 410 to be displayed based on the relationship between the valid time limit and the present time (S18). Subsequently, the icon image processing unit 352 determines the icon image of the rental content (S20). The processing order of the process for determining the rental mark and the process for determining an icon image may be interchangeable. Alternatively, these processes are performed in parallel. The processes shown as S16-S20 are performed for all the subjects to be displayed (N in S22), and if the processes for all the subjects are completed (Y in S22), the icon image processing unit 352 displays the menu screen (S24). In this process, the rental mark disposing unit 356 disposes the rental mark 410 near the icon image 404 of the rental content or disposes the rental mark 410 so that the rental mark 410 overlaps with the icon image 404.

Figure 12:
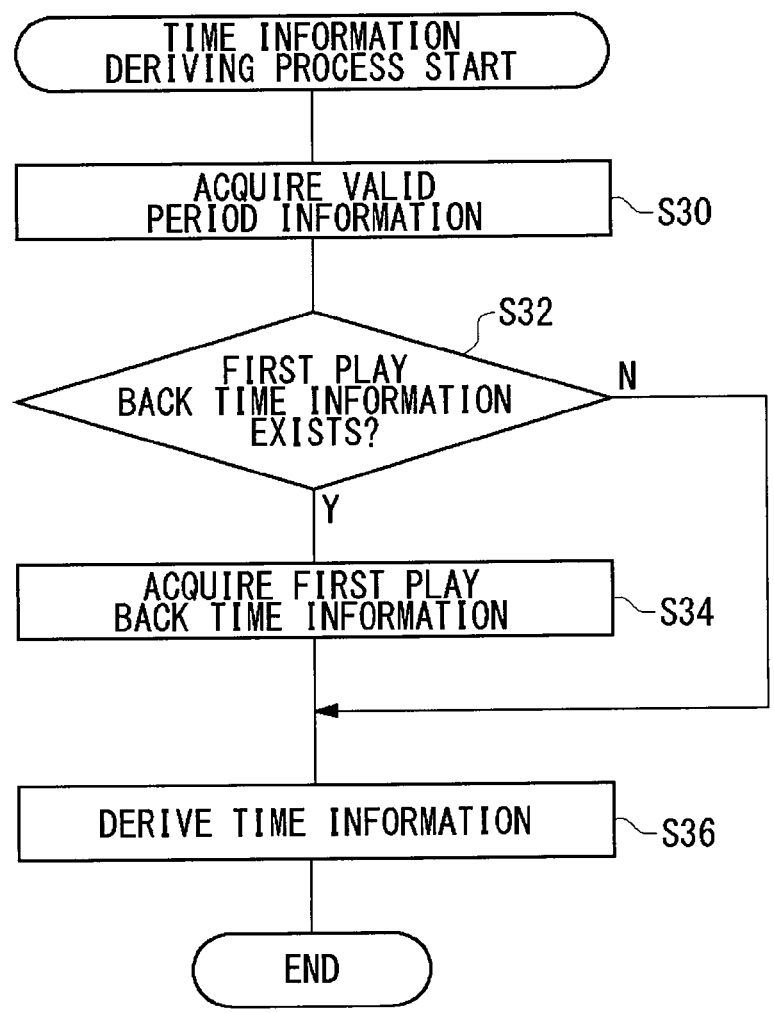
FIG. 12 is a flowchart showing the process of deriving time information.

FIG. 12 is a flowchart showing the process of deriving the time information. In the license information processing unit 240, if the content is determined to be rental content, the valid period extracting unit 246 acquires the valid period information indicating the start time of the valid period and the end time of the valid period from the license information and provides the valid period information to the valid period processing unit 220. The valid period processing unit 220 acquires the valid period information (S30). The playback time information acquiring unit 222 checks whether the first playback time information exists by referring to the key file 306 corresponding to the license (S32). If the first playback time information exists (Y in S32), it acquires the information (S34) and provides the information to the start time derivation unit 224 and the end time derivation unit 226. If the first playback time information does not exist (N in S32), the start time derivation unit 224 and the end time derivation unit 226 derive the start time and the end time of the valid period of the content based on the valid period information, respectively (S36). On the other hand, if the first playback time information is acquired, the start time derivation unit 224 and the end time derivation unit 226 derive the start time and the end time of the valid period of the content based on the first playback time information and the valid period information, respectively (S36). In this process, the remaining time derivation unit 228 may derive the remaining time of the valid period.

Figure 13:
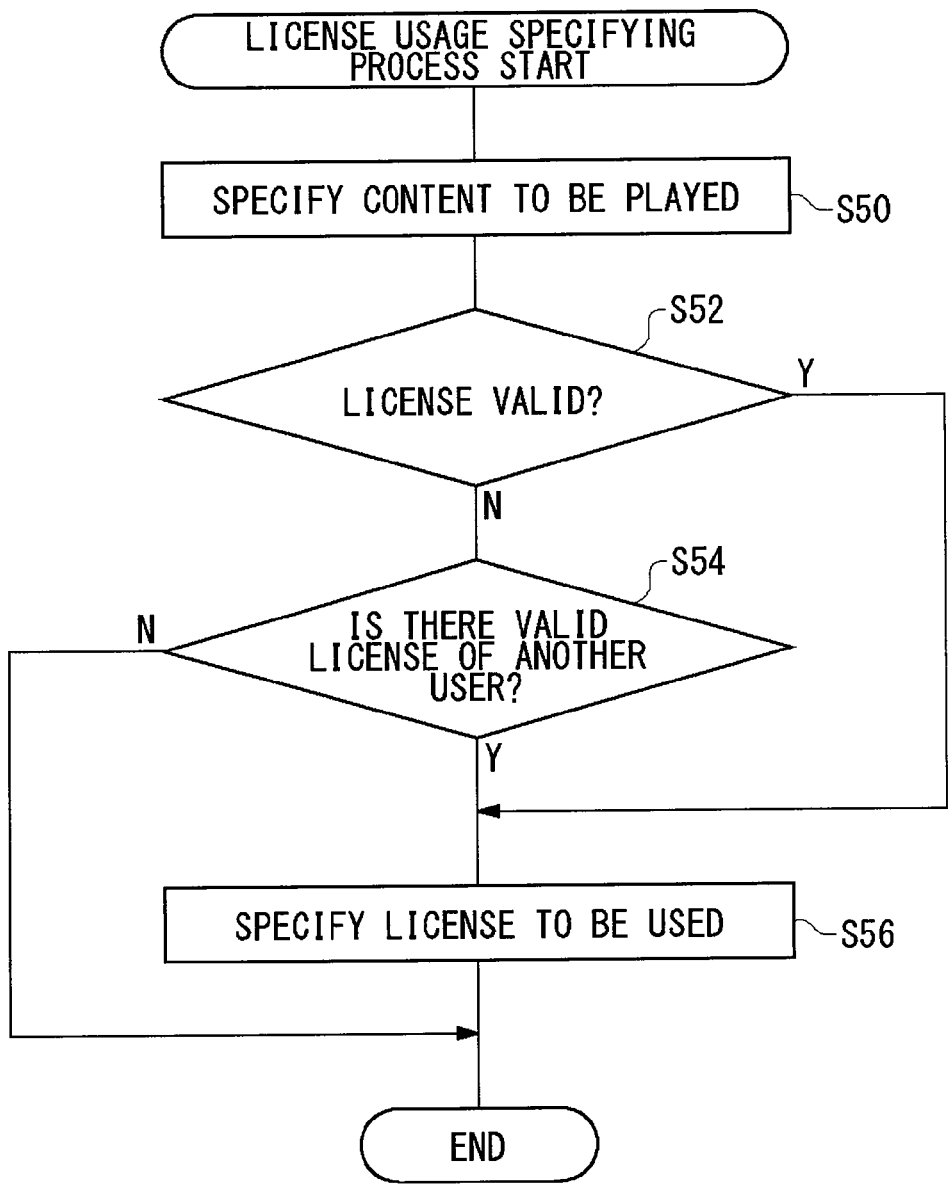
FIG. 13 is a flowchart showing the process of specifying a license to be used.

FIG. 13 is a flowchart showing the process of specifying a license to be used. A user instructs an icon image 404 on the menu screen 400 to play back, and then the playback instructing unit 206 issues an instruction for playing back the content corresponding to the icon image 404 (S50). The license usage specifying unit 282 receives the instruction and determines whether or not the license of the user who instructed the icon image 404 to play back is valid, accordingly (S52). If the license is not valid (N in S52), the license usage specifying unit 282 determines whether there exists a valid license of another user (S54). If the license of the user who instructed the playback is valid (Y in S52), the license usage specifying unit 282 specifies the license of the user as a license to be used (S56).

If other users do not have a valid license either (N in S54), it is determined that there is no valid license for the content instructed to be played back. In this case, the purchase screen of the content may be displayed. On the other hand, if another user has a valid license (Y in S54), the license usage specifying unit 282 specifies the license as a license to be used (S56). The license usage specifying unit 282 may specify a license that has the earliest valid time limit from among the valid licenses of other users as a license to be used.

Given above is an explanation based on the exemplary embodiments. These embodiments are intended to be illustrative only and it will be obvious to those skilled in the art that various modifications to constituting elements and processes could be developed and that such modifications are also within the scope of the present invention.

If the icon image 404 in the focus region is instructed to play back, the confirmation screen generating unit 360 may generate a confirmation screen for asking a user whether to play back before the playback controlling unit 280 starts a process for playing the content back. In the content purchasing system 1, if the playback is started, the valid time limit is set to be the time that is twenty-four hours later. Therefore, it is not preferable if the playback of content is started when the playback instruction is given to the icon image 404 in case the instruction is caused by an error in manipulation by the user. Therefore, the confirmation screen may be presented and the decoding unit 310 may start the decoding process after receiving the confirmation to start from the user.

In case where a plurality of pieces of license information for same content exists, the end time derivation unit 226 may derive the end time that comes the latest. In case the valid periods derived from a plurality of pieces of license information overlap with each other, the end time derivation unit 226 may derive the end time that comes the latest. In the content purchasing system 1, it is set so as to allow a person to watch/listen to content regardless whether or not the person is the owner of the content. Therefore, by deriving the end time that comes the latest and, for example, by allowing the time information disposing unit 358 to include the end time in the menu screen while associating the derived end time with an icon image (thumbnail image), a user can assess that there is still time so that he/she does not have to feel strained to watch and/or listen to the content when he/she does not have enough time. Further, by allowing the time information disposing unit 378 to include the time information relating to the derived valid period while associating the time information with a thumbnail image, a user can instantaneously grasp each status of the licenses belonging to license owners, including the user himself/herself. For example, by displaying the time information, wherein the valid periods for a plurality of licenses are put together, as shown immediately below the thumbnail image 412 on the detailed information screen 420, a user can easily grasp the valid period derived from a plurality of licenses.

For example, assume that the valid period of respective licenses are: from the 1 of June to the 14 of June for user A, from the 7 of June to the 21 of June for user B, and from the 1 of July to the 14 of July for user C. Among these periods, the valid period for user A and that of user B overlap with each other, and the valid period for user C does not overlap with the valid period for any other user. In this case, the valid period processing unit 220 may derive two valid periods.

That is, as the first valid period, the start time derivation unit 224 derives the 1 of June as the start time of the valid period, and the end time derivation unit 226 derives the 21 of June as the end time of the valid period. Further, as the second valid period, the start time derivation unit 224 derives the 1 of July as the start time of the valid period, and the end time derivation unit 226 derives the 14 of June as the end time of the valid period. Time information relating to these two valid periods may be displayed in a field located immediately below the thumbnail image 412 on the detailed information screen 420 so that the first valid period is displayed in the upper row and the second valid period is displayed in the lower row. This time information is preferably disposed so that the valid period of with the earlier valid time limit is displayed in the upper row. This time information may be displayed on the menu screen.

The end time derivation unit 226 may derive a virtual valid time limit while taking into consideration the time needed for playing back the content. In a similar manner, the remaining time derivation unit 228 may derive a virtual remaining time while taking into consideration the time needed for playing back the content. More specifically, the end time derivation unit 226 derives the end time by subtracting the time needed for playing back the content from the end time explained in the exemplary embodiment. Similarly, the remaining time derivation unit 228 derives the remaining time by subtracting the time needed for playing back the content from the remaining time explained in the exemplary embodiment. This enables the presentation of the time when the user should start playing back the content in order to assure the complete playback of the content, and the user can start to watch and/or listen to the content while referring to the time as a target.

INDUSTRIAL APPLICABILITY

According to the present invention, technology for improving user friendliness in handling rental content can be provided.

What is claimed is:

1. An information processing apparatus for processing content comprising:
 a tangible storage device operative to store content which is acquired via a network and license information of the content for a plurality of users; and
 a processor coupled to the tangible storage device, wherein the processor is configured to execute steps comprising:
 determining whether or not the content is rental content, which has a valid time limit for accessing, from purchase type information included in the license information;
 generating a display screen for selecting content, wherein the display generating function disposes an icon image of the content on the display screen, disposes a folder image on the display screen, and, in a case where the content is determined to be rental content, disposes a rental mark, which indicates that the associated content is rental content, near the icon image of the content or disposes the rental mark so as to overlap with the icon image;
 accessing the license information in the storage device and determining that a license of a user who selected the icon image of the content is not valid;

in response to the determining that the license of the user who selected the icon image of the content is not valid, specifying a valid license of another user as a license to be used for the content;

generating a confirmation screen for confirming with the user and receiving a response from the user whether to allow a processing of the content to be started using the valid license of another user so that the user can avoid using the license of another by mistake;

setting a valid period end time for the content based on valid period information associated with the valid license of another user;

decoding the content using the valid license of another user and key information from a key file associated with the valid license of another user;

in response to the content being played back for a first time, writing first playback time information for the content into the key file; and in response to the content being played back for the first time, resetting the valid period end time for the content based on the first playback time information from the key file, wherein the valid period end time is reset to a time and date that is a predetermined amount of time after the first playback time.

2. The information processing apparatus according to claim 1, wherein the display generating function disposes, in a case where a folder includes rental content, a rental mark near an image of the folder or disposes the rental mark so as to overlap with the image of the folder.

3. The information processing apparatus according to claim 1, wherein the processor is further configured to execute steps comprising:

after an instruction is given to play back an icon image of rental content for which the valid time limit has already passed, generating a purchasing screen of the rental content.

4. The information processing apparatus according to claim 1, wherein the processor is further configured to execute steps comprising:

allocating a first rental mark to the rental content for which a valid time limit has not yet arrived and allocating a second rental mark to the rental content for which a valid time limit has already passed.

5. The information processing apparatus according to claim 4, wherein the allocating a first rental mark further comprises allocating different rental marks to rental content for which remaining time until the valid time limit is equal to or more than a predetermined period and to rental content for which the remaining time is less than the predetermined period.

6. The information processing apparatus according to claim 4, wherein the processor is further configured to execute steps comprising:

deriving a virtual valid time limit, while taking a time period that is necessary for playback of the content into account, by subtracting the time needed for playing back the content from the actual valid time;

wherein the first rental mark or the second rental mark are allocated by using the virtual valid time.

7. The information processing apparatus according to claim 1, wherein:

folders form a hierarchical structure and the rental content is included in a folder that is positioned at a layer lower than a folder positioned at a top level; and the display generating function disposes the rental mark near an image of the folder positioned at the top level or disposes the rental mark so as to overlap with the image of the folder positioned at the top level, and the display generating function also disposes the rental mark near an image of the folder positioned at the lower layer or disposes the rental mark so as to overlap with the image of the folder positioned at the lower layer.

8. The information processing apparatus according to claim 7, wherein:

the display generating function disposes a plurality of images of folders, which are positioned at the top level folder prepared for each type of content, on a top menu screen in an array; and the display generating function disposes the rental mark near the image of the folder which is displayed on the top menu screen and positioned at the top level or disposes the rental mark so as to overlap with the image of the folder.

9. A non-transitory computer readable recording medium having recorded thereon a program, the program adapted to cause a computer to perform, when executed, functions comprising:

receiving content via a network;

determining whether or not the content is rental content, which has a valid time limit for accessing, from purchase type information included in license information of the content, the information stored in a storage device;

generating a display screen for selecting content, wherein the display generating function disposes an icon image of the content on the display screen, disposes a folder image on the display screen, and, in a case where the content is determined to be rental content, disposes a rental mark, which indicates that the associated content is rental content, near the icon image of the content or disposes the rental mark so as to overlap with the icon image;

accessing the license information in the storage device and determining that a license of a user who selected the icon image of the content is not valid;

in response to the determining that the license of the user who selected the icon image of the content is not valid, specifying a valid license of another user as a license to be used for the content;

generating a confirmation screen for confirming with the user and receiving a response from the user whether to allow a processing of the content to be started using the valid license of another user so that the user can avoid using the license of another by mistake;

setting a valid period end time for the content based on valid period information associated with the valid license of another user;

decoding the content using the valid license of another user and key information from a key file associated with the valid license of another user;

in response to the content being played back for a first time, writing first playback time information for the content into the key file; and in response to the content being played back for the first time, resetting the valid period end time for the content based on the first playback time information from the key file, wherein the valid period end time is reset to a time and date that is a predetermined amount of time after the first playback time.

* * * * *